(12) United States Patent
Huke et al.

(10) Patent No.: US 12,469,038 B2
(45) Date of Patent: Nov. 11, 2025

(54) METHOD OF DETERMINING A USER'S LONG-TERM VALUE AND FINDING A SIMILAR NEW USER

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/510,543

(22) Filed: Oct. 26, 2021

(65) Prior Publication Data

US 2022/0130205 A1    Apr. 28, 2022

Related U.S. Application Data

(60) Provisional application No. 63/105,480, filed on Oct. 26, 2020.

(51) Int. Cl.
| | | |
|---|---|---|
| *G06Q 30/0204* | (2023.01) | |
| *G06Q 30/0207* | (2023.01) | |
| *G06Q 30/0251* | (2023.01) | |
| *G06Q 50/34* | (2012.01) | |
| *G07F 17/32* | (2006.01) | |

(52) U.S. Cl.
CPC ..... *G06Q 30/0204* (2013.01); *G06Q 30/0207* (2013.01); *G06Q 30/0255* (2013.01); *G06Q 50/34* (2013.01); *G07F 17/323* (2013.01); *G07F 17/3237* (2013.01); *G07F 17/3288* (2013.01)

(58) Field of Classification Search
CPC .......... G06Q 30/0204; G06Q 30/0207; G06Q 30/0255; G06Q 50/34; G07F 17/323; G07F 17/34; G07F 17/3237; G07F 17/3288
See application file for complete search history.

(56) References Cited

U.S. PATENT DOCUMENTS 5,761,647 A * 6/1998 Boushy .............. G06Q 30/0201
                                                           705/7.29
2004/0254010 A1* 12/2004 Fine .................... G07F 17/3239
                                                           463/25

(Continued)

OTHER PUBLICATIONS

Gainsbury et al., "A taxonomy of gambling and casino games via social media and online technologies"; International Gambling Studies; 2014; vol. 14, No. 2, pp. 196-213.

(Continued)

*Primary Examiner* — Steve Rowland
(74) *Attorney, Agent, or Firm* — Maier & Maier, PLLC

(57) ABSTRACT

The present disclosure provides a method of determining a user's long-term value to a wagering network and identifying new users similar to the users that provide long-term value to the wagering network. This method determines a user's long-term value and the user's engagement with a wagering network and places the users into cohorts. The method also provides finding correlations with the users' data and then correlating the data of new users and comparing the correlation coefficients of the new users with the older users to group the new users into the cohorts similar to the older users to predict their long-term value to the wagering network.

18 Claims, 5 Drawing Sheets

(56) References Cited

U.S. PATENT DOCUMENTS

Figure 1:
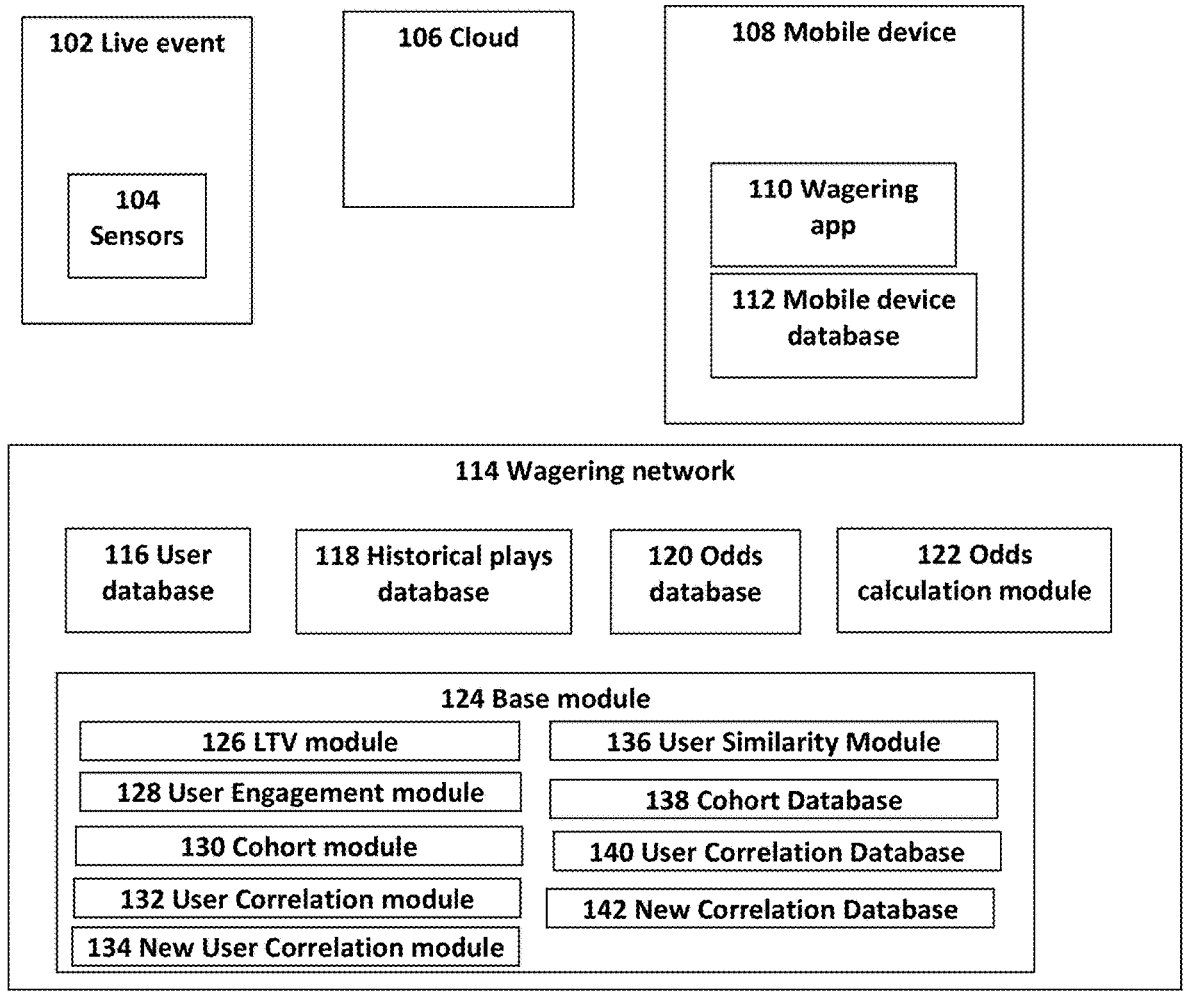

| | | |
|---|---|---|
| 2009/0070081 A1* | 3/2009 | Saenz ................ G07F 17/3227 |
| | | 703/2 |
| 2009/0170612 A1 | 7/2009 | Herrmann et al. |
| 2009/0170614 A1* | 7/2009 | Herrmann ............... G07F 17/32 |
| | | 463/43 |
| 2010/0144426 A1 | 6/2010 | Winner et al. |
| 2012/0064964 A1 | 3/2012 | Crosthwaite et al. |
| 2012/0142411 A1 | 6/2012 | Thompson |
| 2012/0158454 A1 | 6/2012 | Saunders et al. |
| 2022/0343590 A1* | 10/2022 | Jutan ...................... G06T 15/50 |

OTHER PUBLICATIONS

International Search Report and Written Opinion issued on Jan. 28, 2022 in corresponding International Patent Application No. PCT/US2021/056589; 14 pages.

* cited by examiner

| Cohort | Requirement | | | | | |
|---|---|---|---|---|---|---|
| | Average Number of Wagers | Median of Wagers | Mean of Wagers | Time on App | Time on Research | Time on Wager Markets |
| 1 | >50 Wagers per Week | >$50 per Wager | >$50 per Wager | >8 Hours Per Week | >4 Hours per Week | >4 Hours per Week |
| 2 | 49-25 Wagers per Week | $49-$25 per Wager | $49-25 per Wager | 8-4 Hours Per Week | 3-1 Hours Per Week | 3-1 Hours Per Week |
| 3 | <25 Wagers per Week | <$25 per Wager | <$25 per Wager | <4 Hours Per Week | <1 Hours per Week | <1 Hours per Week |
| - | - | - | - | - | - | - |
| - | - | - | - | - | - | - |
| - | - | - | - | - | - | - |

Fig.9

| User ID | Correlations | | | N |
|---|---|---|---|---|
| | Average Wager Size vs. Number of Contacts | Average Wager Size vs. Time on App | Average Wager Size vs. Time on Research | |
| JS123456 | 0.91 | 0.89 | 0.88 | - |
| TB12777 | 0.75 | 0.74 | 0.65 | - |
| BH09876 | 0.89 | 0.75 | 0.54 | - |
| - | - | - | - | - |
| - | - | - | - | - |
| - | - | - | - | - |

Fig.10

| User ID | Correlations | | | N |
|---|---|---|---|---|
| | Average Wager Size vs. Number of Contacts | Average Wager Size vs. Time on App | Average Wager Size vs. Time on Research | |
| TR98765 | 0.91 | 0.89 | 0.88 | - |
| JE32165 | 0.75 | 0.74 | 0.65 | - |
| RB45678 | 0.76 | 0.52 | 0.43 | - |
| - | - | - | - | - |
| - | - | - | - | - |
| - | - | - | - | - |

Fig.11

METHOD OF DETERMINING A USER'S LONG-TERM VALUE AND FINDING A SIMILAR NEW USER

FIELD

The present disclosure is generally related to play-by-play wagering on live sporting events.

BACKGROUND

Currently, wagering platforms and wagering applications, it is difficult to determine a user's long-term value to the platform or application and the user's engagement on the platform or application.

Also, it is difficult to group the important or highly valued users into certain groups or cohorts based on their value to the platform or application.

Lastly, it is challenging to determine a new user's value to the wagering application or platform and determine the user's engagement on the application or platform when there is insufficient data to support a prediction.

SUMMARY

Methods, systems, and apparatuses for evaluating users of a wagering network may be provided. In one embodiment, a method of rating a long-term value of a user and finding a similar new user on a wagering network includes rating long term value information associated with the experienced user from the user wagering data; determining user engagement information associated with the experienced user from the user wagering data; performing correlations on user parameters based on the wagering data, the long term value information, and the user engagement information associated with the experienced user; extracting user wagering data from the user database for the new user, wherein the new user is a user with less than the threshold number of wagers; performing correlations on user parameters for the new user based on wagering data, long term value information, and user engagement information associated with the new user; filtering the new correlation database for correlations of a first user ID; and searching for correlated parameters from the user correlation database that fall within a threshold variance of the correlations of the first user ID.

In another embodiment, a system for rating a long-term value of a user and finding a similar new user on a wagering network can include a user database which contains wagering data associated with at least one user and stores long term value information and user engagement information; a long term value (LTV) module which extracts wagering data for an experienced user with more than a threshold number of wagers from the at least one user in the user database and rates the long term value information associated with the experienced user from the wagering data associated with the user; a user engagement module which extracts the wagering data for the experienced user with more than the threshold number of wagers from the at least one user in the user database and determines the user engagement information associated with the experienced user from the wagering data associated with the user; a user correlation module which performs correlations on user parameters based on the long term value information, user engagement information, and wagering data associated with the experienced user for the experienced user with more than the threshold number of wagers based on the wagering data, the long term value information, and the user engagement information associated with the experienced user; a new user correlation module which performs correlations on user parameters for a new user with less than the threshold number of wagers based on the wagering data, the long term value information, and the user engagement information associated with the new user; and a user similarity module which determines correlations of a first user ID and searches for correlated parameters that fall within a threshold variance of the correlations of a first user ID.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a method for determining a user's long-term value and finding a similar new user, according to an embodiment.

Figure 2:
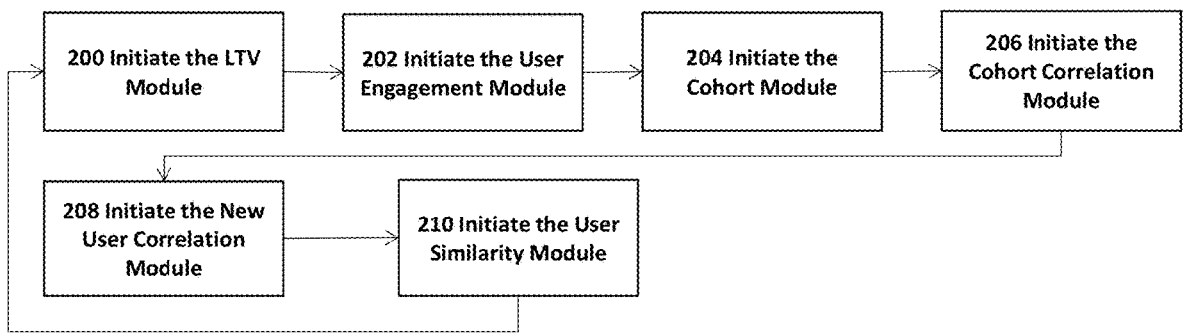

FIG. 2: illustrates a base module, according to an embodiment.

Figure 3:
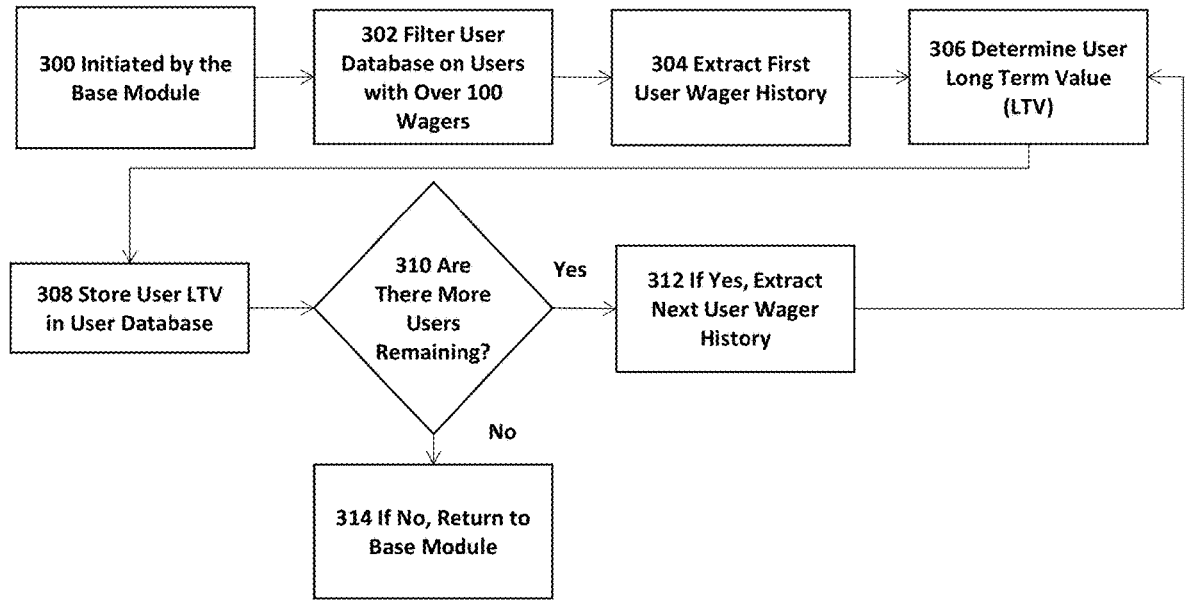

FIG. 3: illustrates an LTV module, according to an embodiment.

Figure 4:
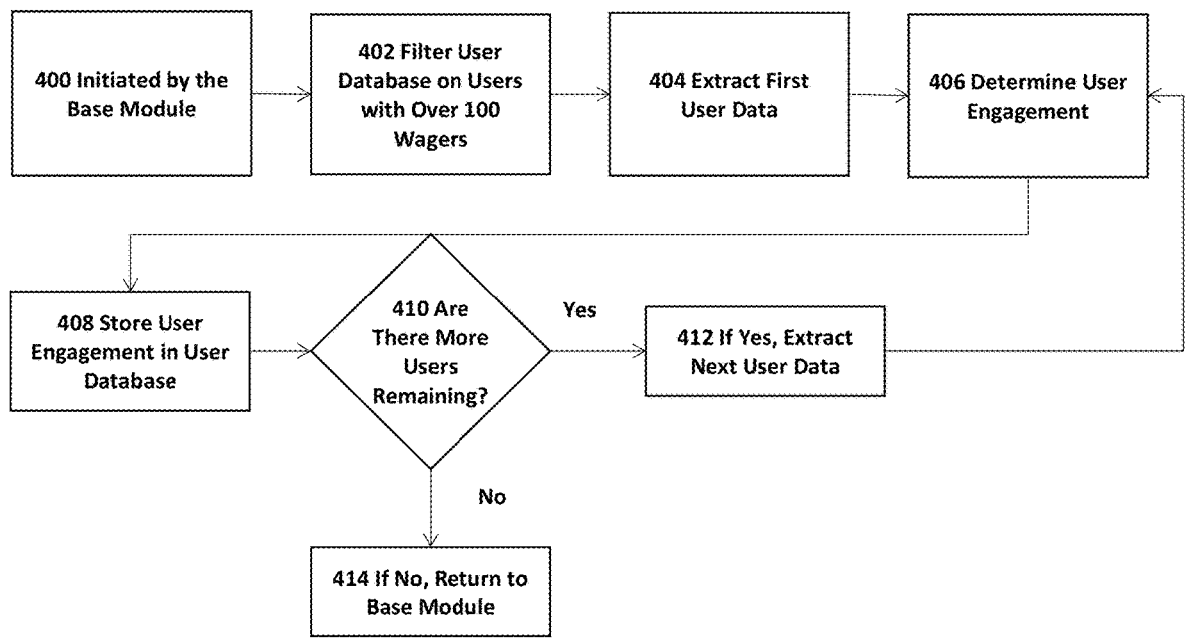

FIG. 4: illustrates a user engagement module, according to an embodiment.

Figure 5:
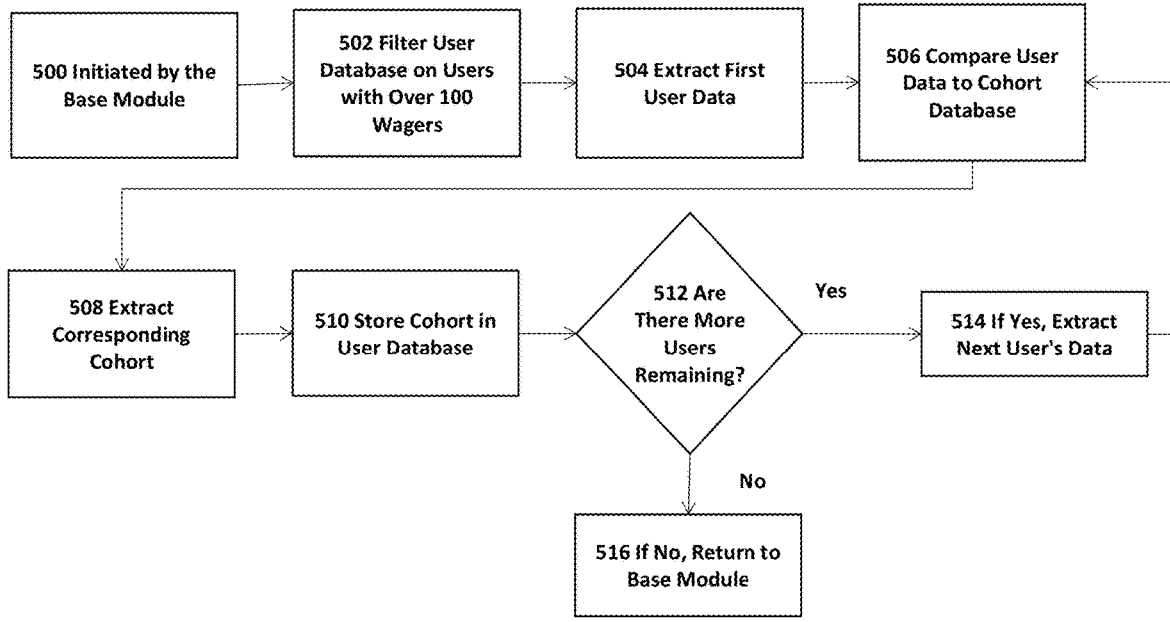

FIG. 5: illustrates a cohort module, according to an embodiment.

Figure 6:
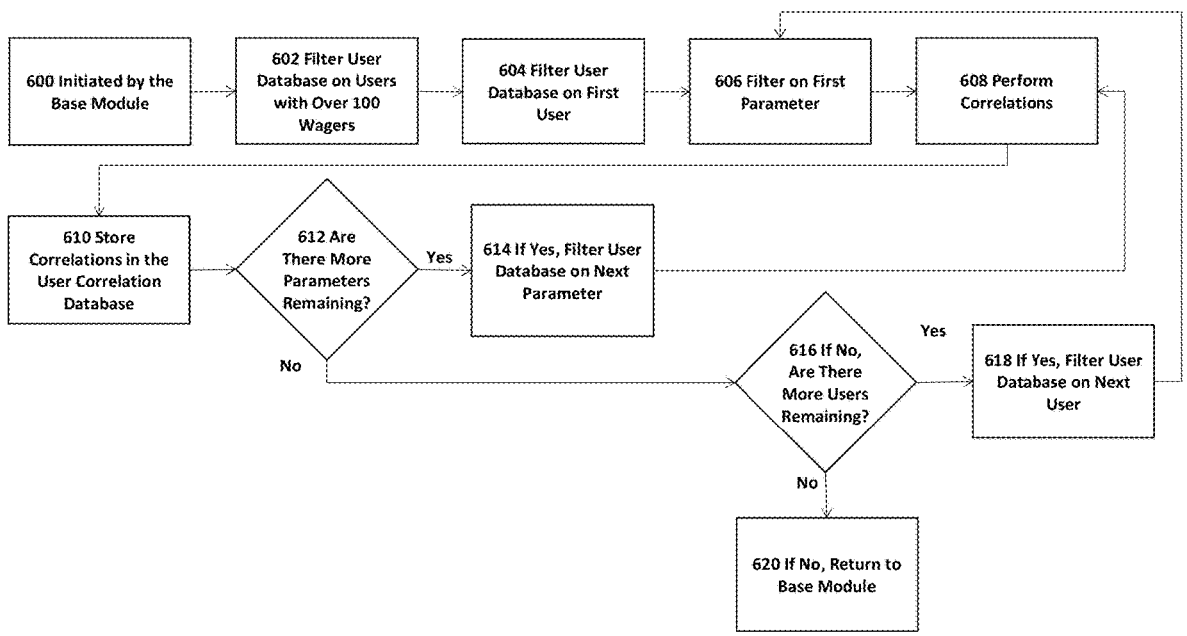

FIG. 6: illustrates a user correlation module, according to an embodiment.

Figure 7:
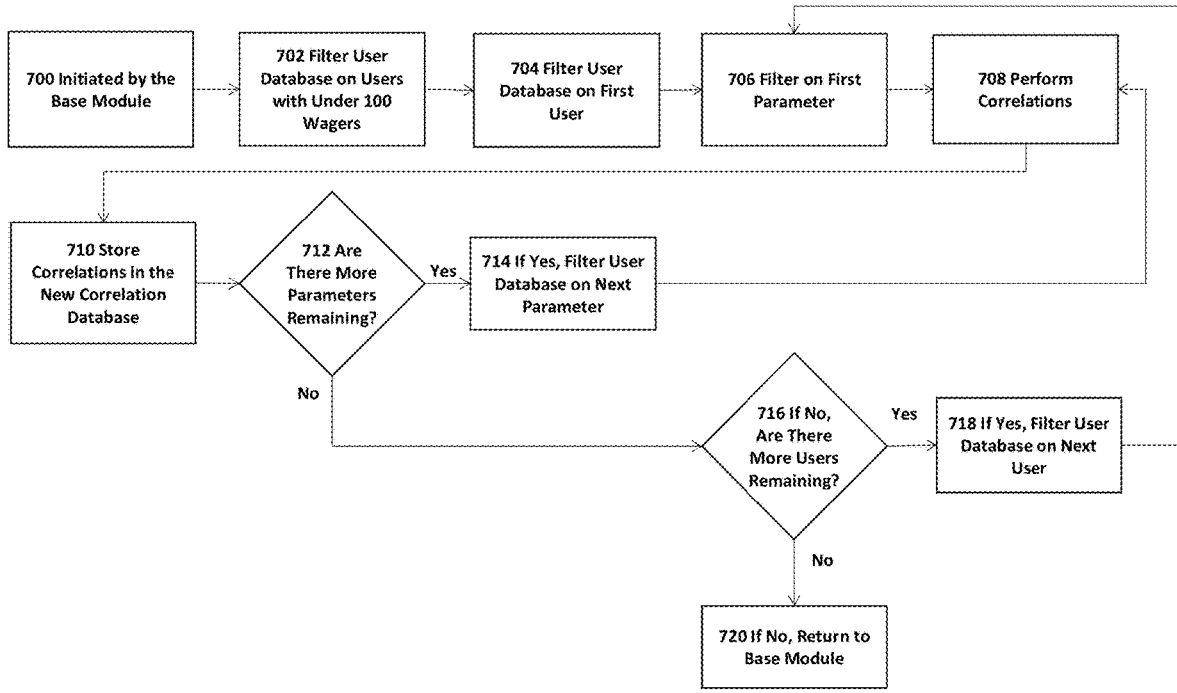

FIG. 7: illustrates a new user correlation module, according to an embodiment.

Figure 8:
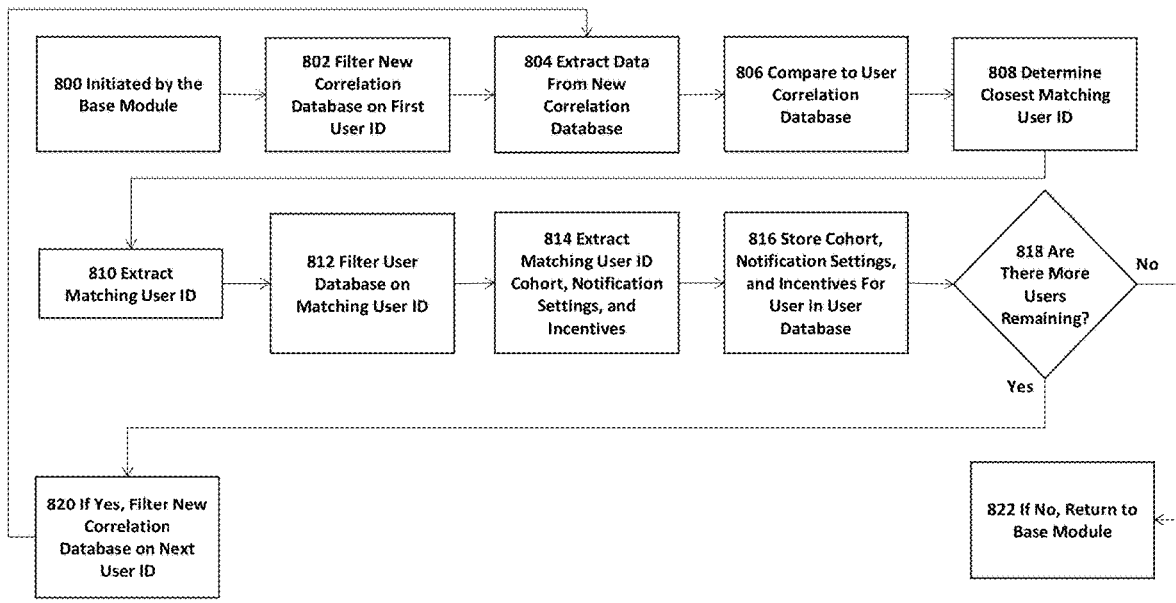

FIG. 8: illustrates a user similarity module, according to an embodiment.

FIG. 9: illustrates a cohort database, according to an embodiment.

FIG. 10: illustrates a user correlation database, according to an embodiment.

FIG. 11: illustrates a new correlation database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy.

Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a method for determining a user's long-term value and finding a similar new user. This system may include a live event 102, for example, a sporting event such as a football, basketball, baseball, or hockey game, tennis match, golf tournament, eSports or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle which limit the amount of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include, but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the Internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play, and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include, but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include, but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including, but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the Internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play, and may be compared with a variety of team data and league data based on a variety of elements, including the current down, possession, score, time, team, and so forth, as described in various exemplary embodiments herein. The wagering network 114 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include, but is not limited to, a plurality of betting attributes such as at least one of the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that contains the odds calculated by an odds calculation module 122—to display the odds on the user's mobile device 108 and take bets from the user through the mobile device wagering app 110.

Further, embodiments may include the odds calculation module 122, which utilizes historical play data to calculate odds for in-play wagers.

Further, embodiments may include a base module 124, which initiates a long-term value (LTV) module 126, a user engagement module 128, a cohort module 130, a user correlation module 132, a new user correlation module 134, and a user similarity module 136.

Further, embodiments may include the LTV module 126, which filters the user database 116 on users over a threshold number of wagers, such as 100 wagers. In some embodiments the threshold number of wagers may be a different number, such as 150 wagers, 200 wagers, or any other number. First, the LTV module 126 extracts the first user's wager history. Then the LTV module 126 determines the user's LTV to the wagering network 114. The LTV module 126 stores the user's LTV data in the user database 116. Then the LTV module 126 determines if more users remain in the user database 116 who have completed over 100 wagers. If it is determined that more users are remaining, the LTV module 126 extracts the next user's wager history from the user database 116. If it is determined that there are no more users remaining, the LTV module 126 returns to the base module 124.

Further, embodiments may include the user engagement module 128, which filters the user database 116 on users over the threshold number of wagers, such as 100 wagers. In some embodiments the threshold number of wagers may be a different number, such as 150 wagers, 200 wagers, or any other number. First, the user engagement module 128 extracts the first user's data from the user database 116. Then the user engagement module 128 determines the user's engagement on the wagering network 114; the user engagement module 128 stores the user's engagement data in the user database 116. Then the user engagement module 128 determines if more users remain in the user database 116 who have completed over 100 wagers. If it is determined that more users are remaining, the user engagement module 128 extracts the next user's data from the user database 116. If it is determined that there are no more users remaining, the user engagement module 128 returns to the base module 124.

Further, embodiments may include the cohort module 130 that filters the user database 116 on users who have completed over the threshold number of wagers, such as 100 wagers. In some embodiments the threshold number of wagers may be a different number, such as 150 wagers, 200 wagers, or any other number. Such users who have placed more than a threshold number of wagers may be known or understood to be experienced users or experienced wagerers. The cohort module 130 extracts the first user's data from the user database 116. Then the cohort module 130 compares the extracted user's data to a cohort database 138. The cohort module 130 extracts the corresponding cohort from the cohort database 138. Then the cohort module 130 stores the extracted corresponding cohort in the user database 116 with the associated user. Next, the cohort module 130 determines if more users are remaining in the user database 116. If it is determined that more users are remaining in the user database 116, the cohort module 130 extracts the next user's data from the user database 116. If it is determined that there are no more users remaining in the user database with over 100 wagers, then the cohort module 130 returns to the base module 124.

Further, embodiments may include the user correlation module 132, which filters the user database 116 on users who have completed over the threshold number of wagers, such as 100 wagers. In some embodiments the threshold number of wagers may be a different number, such as 150 wagers, 200 wagers, or any other number. Then the user correlation module 132 filters the user database 116 on the first user. Then the user correlation module 132 filters the user's data on the first parameter. Then the user correlation module 132 performs correlations on the remaining parameters. Then the user correlation module 132 stores the correlations in a user correlation database 140. Then the user correlation module 132 determines if more parameters are remaining. If it is determined that more parameters are remaining, the user correlation module 132 filters the user database 116 on the next parameter. If it is determined that there are no more parameters remaining for the filtered user in the user database 116, the user correlation module 132 determines if more users are remaining in the user database 116. If it is determined that more users are remaining in the user database 116, the user correlation module 132 filters the user database 116 on the next user and the process returns to filtering the user database 116 on the first parameter. If it is determined that there are no more users remaining in the user database 116, then the user correlation module 132 returns to the base module 124.

Further, embodiments may include the new user correlation module 134, which filters the user database 116 on users with under the threshold number of wagers, such as 100 wagers. In some embodiments the threshold number of wagers may be a different number, such as 150 wagers, 200 wagers, or any other number. Then the new user correlation module 134 filters the user database 116 on the first user. Then the new user correlation module 134 filters the user's data on the first parameter. Then the new user correlation module 134 performs correlations on the remaining parameters. Then the new user correlation module 134 stores the correlations in the new correlation database 142. Then the new user correlation module 134 determines if more parameters are remaining. If it is determined that more parameters are remaining, the new user correlation module 134 filters the user database 116 on the next parameter. If it is determined that there are no more parameters remaining for the filtered user in the user database 116, the new user correlation module 134 determines if more users are remaining in the user database 116. If it is determined that more users are remaining in the user database 116, the new user correlation module 134 filters the user database 116 on the next user and the process returns to filtering the user database 116 on the first parameter. If it is determined that there are no more users remaining in the user database 116, then the new user correlation module 134 returns to the base module 124.

Further, embodiments may include the user similarity module 136, which filters a new correlation database 142 on the first user ID. Then the user similarity module 136 extracts the user's data from the new correlation database 142. First, the user similarity module 136 compares the extracted user's data to the user correlation database 140. Then the user similarity module 136 determines the closest matching user ID. Then the user similarity module 136 extracts the matching user ID. The user similarity module 136 filters the user database 116 on the matching user ID. Then the user similarity module 136 extracts the matching user ID's cohort, notification settings, and incentives. The user similarity module 136 then stores the extracted cohort, notification settings, and incentives in the user database 116 for the matched user. Then the user similarity module 136 determines if more users are remaining in the new correlation database 142. If it is determined that more users are remaining in the new correlation database 142, the user similarity module 136 filters the new correlation module 136 on the next user ID, and the process returns to extract the user's data from the new correlation database 142. If it is determined that there are no more users remaining in the new correlation database 142, then the user similarity module 136 returns to the base module 124.

Further, embodiments may include the cohort database 138. The database contains the thresholds to determine a user's cohort and the corresponding cohort, for example, the cohort, and the requirements such as the average number of wagers per week, the median of wagers per week in dollar amounts, the mean of wagers per week in dollar amounts, the time the user spends on the application per week, the amount of time the user spends on research per week, the amount of time the user spends on the wager markets per week or the time the user is viewing the wagers offered by the application per week. The database is used in the process described in the cohort module 130, in which the user's data stored in the user database 116 is compared to these thresholds to determine which cohort the user belongs to. The cohorts may represent the type of player that the user is on the application, such as an expert, average, or beginner user, which may be used to determine the user's long-term value to the wagering network 114. In some embodiments, the thresholds may have different periods such as per month, per quarter, per year, etc. In some embodiments, the user may need to exceed the thresholds for all the requirements stored in the cohort database 138, a predetermined number of requirements, such as 3, or exceed the threshold of one requirement to be considered to be placed in the corresponding cohort.

Further, embodiments may include the user correlation database 140. The database is created in the process described in the user correlation module 132, in which the user's data is correlated with other types of user data, and the correlation coefficients are stored in the database. The database is also used in the user similarity module 136 in which the users in this database may be matched with new users using the correlation coefficients stored in the new correlation database 142 to determine how new users will behave on the wagering network by finding a similar user in the user correlation database 140. The database contains the user IDs, such as JS 12345, the correlation coefficients of correlated data, such as the average wager size vs. the number of contacts the user has with a correlation coefficient of 0.91, the average wager size vs. the time the user spends on the application with a correlation coefficient of 0.89, or the average wager size vs. the time the user spends on research with a correlation coefficient of 0.88. "N" may be used to represent an infinite number of the potential correlation coefficients between two pieces of data stored in the database.

Further, embodiments may include the new correlation database 142. The database is created in the process described in the new user correlation module 134, in which the user's data is correlated with other types of user data, and the correlation coefficients are stored in the database. The database is also used in the user similarity module 136 in which the new users in this database may be matched with users using the correlation coefficients stored in the user correlation database 140 to determine how new users will behave on the wagering network by finding a similar user in the user correlation database 140. The database contains the user IDs, such as TR98765, the correlation coefficients of correlated data, such as the average wager size vs. the number of contacts the user has with a correlation coefficient of 0.91, the average wager size vs. the time the user spends on the application with a correlation coefficient of 0.89, or the average wager size vs. the time the user spends on research with a correlation coefficient of 0.88. "N" may be used to represent an infinite number of the potential correlation coefficients between two pieces of data stored in the database.

FIG. 2 illustrates the base module 124. The process begins with the base module 124 initiating, at step 200, the LTV module 126. For example, the LTV module 126 filters the user database 116 on users over the threshold number of wagers, such as 100 wagers. In some embodiments the threshold number of wagers may be a different number, such as 150 wagers, 200 wagers, or any other number. The LTV module 126 extracts the first user's wager history. Then the LTV module 126 determines the user's LTV to the wagering network 114. The LTV module 126 stores the user's LTV data in the user database 116. Then the LTV module 126 determines if more users remain in the user database 116 who have completed over the threshold number of wagers, such as 100 wagers. In some embodiments the threshold number of wagers may be a different number, such as 150 wagers, 200 wagers, or any other number. If it is determined that more users are remaining, the LTV module 126 extracts the next user's wager history from the user database 116. If it is determined that there are no more users remaining, the LTV module 126 returns to the base module 124. The base module 124 initiates, at step 202, the user engagement module 128. For example, the user engagement module 128 filters the user database 116 on users with over the threshold number of wagers, such as 100 wagers. In some embodiments the threshold number of wagers may be a different number, such as 150 wagers, 200 wagers, or any other number. The user engagement module 128 extracts the first user's data from the user database 116. Then the user engagement module 128 determines the user's engagement on the wagering network 114. The user engagement module 128 stores the user's engagement data in the user database 116. Then the user engagement module 128 determines if more users remain in the user database 116 who have completed over the threshold number of wagers, such as 100 wagers. In some embodiments the threshold number of wagers may be a different number, such as 150 wagers, 200 wagers, or any other number. If it is determined that more users are remaining, the user engagement module 128 extracts the next user's data from the user database 116. If it is determined that there are no more users remaining, the user engagement module 128 returns to the base module 124. The base module 124 initiates, at step 204, the cohort module 130. For example, the cohort module 130 filters the user database 116 on users that have completed over the threshold number of wagers, such as 100 wagers. In some embodiments the threshold number of wagers may be a different number, such as 150 wagers, 200 wagers, or any other number. The cohort module 130 extracts the first user's data from the user database 116. Then the cohort module 130 compares the extracted user's data to the cohort database 138. The cohort module 130 extracts the corresponding cohort from the cohort database 138. Then the cohort module 130 stores the extracted corresponding cohort in the user database 116 with the associated user. The cohort module 130 determines if more users are remaining in the user database 116. If it is determined that more users are remaining in the user database 116, the cohort module 130 extracts the next user's data from the user database 116. If it is determined that there are no more users remaining in the user database with over the threshold number of wagers, such as 100 wagers. In some embodiments the threshold number of wagers may be a different number, such as 150 wagers, 200 wagers, or any other number, then the cohort module 130 returns to the base module 124. The base module 124 initiates, at step 206, the user correlation module 132. For example, the user correlation module 132 filters the user database 116 on users with over the threshold number of wagers, such as 100 wagers. In some embodiments the threshold number of wagers may be a different number, such as 150 wagers, 200 wagers, or any other number. Then the user correlation module 132 filters the user database 116 on the first user. The user correlation module 132 filters the user's data on the first parameter. Then the user correlation module 132 performs correlations on the remaining parameters. The user correlation module 132 stores the correlations in the user correlation database 140. Then the user correlation module 132 determines if more parameters are remaining. If it is determined that more parameters are remaining, the user correlation module 132 filters the user database 116 on the next parameter. If it is determined that there are no more parameters remaining for the filtered user in the user database 116, the user correlation module 132 determines if more users are remaining in the user database 116. If it is determined that more users are remaining in the user database 116, the user correlation module 132 filters the user database 116 on the next user and the process returns to filtering the user database 116 on the first parameter. If it is determined that there are no more users remaining in the user database 116, then the user correlation module 132 returns to the base module 124. The base module 124 initiates, at step 208, the new user correlation module 134. For example, the new user correlation module 134 filters the user database 116 on users with under the threshold number of wagers, such as 100 wagers. In some embodiments the threshold number of wagers may be a different number, such as 150 wagers, 200 wagers, or any other number. Then the new user correlation module 134 filters the user database 116 on the first user. The new user correlation module 134 filters the user's data on the first parameter. Then the new user correlation module 134 performs correlations on the remaining parameters. The new user correlation module 134 stores the correlations in the new correlation database 142. Then the new user correlation module 134 determines if more parameters are remaining. If it is determined that more parameters are remaining, the new user correlation module 134 filters the user database 116 on the next parameter. If it is determined that there are no more parameters remaining for the filtered user in the user database 116, the new user correlation module 134 determines if more users are remaining in the user database 116. If it is determined that more users are remaining in the user database 116, the new user correlation module 134 filters the user database 116 on the next user and the process returns to filtering the user database 116 on the first parameter. If it is determined that there are no more users remaining in the user database 116, then the new user correlation module 134 returns to the base module 124. The base module 124 initiates, at step 210, the user similarity module 136. For example, the user similarity module 136 filters the new correlation database 142 on the first user ID. Then the user similarity module 136 extracts the user's data from the new correlation database 142. The user similarity module 136 compares the extracted user's data to the user correlation database 140. Then the user similarity module 136 determines the closest matching user ID. Then the user similarity module 136 extracts the matching user ID. The user similarity module 136 filters the user database 116 on the matching user ID. Then the user similarity module 136 extracts the matching user ID's cohort, notification settings, and incentives. The user similarity module 136 stores the extracted cohort, notification settings, and incentives in the user database 116 for the matched user. Then the user similarity module 136 determines if more users are remaining in the new correlation database 142. If it is determined that more users are remaining in the new correlation database 142, the user similarity module 136 filters the new correlation module 136 on the next user ID, and the process returns to extract the user's data from the new correlation database 142. If it is determined that there are no more users remaining in the new correlation database 142, then the user similarity module 136 returns to the base module 124.

FIG. 3 illustrates the LTV module 126. The process begins with the LTV module 126 being initiated, at step 300, by the base module 124. Then the LTV module 126 filters, at step 302, the user database 116 on users with over the threshold number of wagers, such as 100 wagers. In some embodiments the threshold number of wagers may be a different number, such as 150 wagers, 200 wagers, or any other number. The LTV module 126 extracts, at step 304, the first user's wager history. For example, the LTV module 126 extracts the wagering history of the first user ID listed in the filtered user database 116. Then the LTV module 126 rates, at step 306, the user's LTV to the wagering network 114. For example, the LTV module 126 rates the user's long-term value to the wagering network 114 by using the user's wager history to determine the user's average number of wagers per week, the user's median of wagers per week in dollar amounts, and the user's mean of wagers per week in dollar amounts. Another period may be used in some embodiments, such as per month, per quarter, per year, etc. In some embodiments, the user's long-term value to the wagering network may be rated by how many friends the user invites to the wagering network 114, how much money the user loses to the wagering network 114, how much a user promotes the wagering network 114 on other applications, etc. The LTV module 126 stores, at step 308, the user's LTV data in the user database 116. For example, the user's average number of wagers per week, the user's median of wagers per week in dollar amounts, and the user's mean of wagers per week in dollar amounts are stored in the user database 116. For example, user ID JS12345 may have an average number of wagers per week of 60, a median of wagers per week of $55 per wager, and a mean of wagers per week of $55 per wager, and this data is stored in the user database 116. Then the LTV module 126 determines, at step 310, if more users remain in the user database 116 that have completed over the threshold number of wagers, such as 100 wagers. In some embodiments the threshold number of wagers may be a different number, such as 150 wagers, 200 wagers, or any other number. For example, if there are remaining user IDs stored in the user database 116 that have completed over the threshold number of wagers, such as 100 wagers. In some embodiments the threshold number of wagers may be a different number, such as 150 wagers, 200 wagers, or any other number. If is determined that more users are remaining the LTV module 126 extracts, at step 312, the next user's wager history from the user database 116. If it is determined that there are no more users remaining, the LTV module 126 returns, at step 314, to the base module 124.

FIG. 4 illustrates the user engagement module 128. The process begins with the user engagement module 128 being initiated, at step 400, by the base module 124. Then the user engagement module 128 filters, at step 402, the user database 116 on users with over the threshold number of wagers, such as 100 wagers. In some embodiments the threshold number of wagers may be a different number, such as 150 wagers, 200 wagers, or any other number. Next, the user engagement module 128 extracts, at step 404, the first user's data from the user database 116. For example, the user engagement module 128 extracts the user data associated with the first user ID listed in the filtered user database 116. Then the user engagement module 128 determines, at step 406, the user's engagement on the wagering network 114. For example, user engagement may be determined by the amount of time a user spends on the application per week, the amount of time the user spends on research on the application per week, and the amount of time spent on the wager markets per week, such as reviewing or viewing the various wagers offered by the application. Finally, the user engagement module 128 stores, at step 408, the user's engagement data in the user database 116. For example, if user ID JS12345 spends 10 hours on the application per week, 5 hours spent on researching on the application per week, and 5 hours spent on the wager markets per week, then this data is stored in the user database 116. Then the user engagement module 128 determines, at step 410, if more users remain in the user database 116 that have completed over the threshold number of wagers, such as 100 wagers. In some embodiments the threshold number of wagers may be a different number, such as 150 wagers, 200 wagers, or any other number. For example, if there are remaining user IDs stored in the user database 116 that have completed over the threshold number of wagers, such as 100 wagers. In some embodiments the threshold number of wagers may be a different number, such as 150 wagers, 200 wagers, or any other number. If it is determined that more users are remaining, the user engagement module 128 extracts, at step 412, the next user's data from the user database 116. If it is determined that there are no more users remaining, the user engagement module 128 returns, at step 414, to the base module 124.

FIG. 5 illustrates the cohort module 130. The process begins with the cohort module 130 being initiated, at step 500, by the base module 124. Then the cohort module 130 filters, at step 502, the user database 116 on users that have completed over the threshold number of wagers, such as 100 wagers. In some embodiments the threshold number of wagers may be a different number, such as 150 wagers, 200 wagers, or any other number. The cohort module 130 extracts, at step 504, the first user's data from the user database 116. For example, the cohort module 130 extracts the user data associated with the first user ID listed in the filtered user database 116. Then the cohort module 130 compares, at step 506, the extracted user's data to the cohort database 138. For example, the cohort module 130 compares the user's average number of wagers per week, the user's median of wagers per week in dollar amounts, and the user's mean of wagers per week in dollar amounts, the amount of time a user spends on the application per week, the amount of time the user spends on research on the application per week, and amount of time spent on the wager markets per week, such as reviewing or viewing the various wagers offered by the application, to the cohort database 138 which contains thresholds for each category to determine which cohort the user should be placed in either to allow the user to be categorized as an expert user, average user, or beginner user. The cohort module 130 extracts, at step 508, the corresponding cohort from the cohort database 138. For example, if user ID JS12345 may have an average number of wagers per week of 60, a median of wagers per week of $55 per wager, and a mean of wagers per week of $55 per wager, spends an average of 10 hours on the application per week, 5 hours spent on researching on the application per week, and 5 hours spent on the wager markets per week.

Then the user would be in cohort one, or the first cohort since the user's data is above all the threshold corresponding to cohort one in the cohort database 138, so cohort one would be extracted. In some embodiments, the user may need to exceed the thresholds for all the requirements stored in the cohort database 138, a predetermined number of requirements, such as 3, or exceed the threshold of one requirement to be considered to be placed in the corresponding cohort. Then the cohort module 130 stores, at step 510, the extracted corresponding cohort in the user database 116 with the associated user. For example, the user ID JS12345 would be in cohort one, so this data would be stored in the user database 116. The cohort module 130 determines, at step 512, if more users remain in the user database 116. For example, if there are remaining user IDs stored in the user database 116 that have completed over the threshold number of wagers, such as 100 wagers. In some embodiments the threshold number of wagers may be a different number, such as 150 wagers, 200 wagers, or any other number. If it is determined that more users are remaining in the user database 116, the cohort module 130 extracts, at step 514, the next user's data from the user database 116. If it is determined that there are no more users remaining in the user database with over the threshold number of wagers, such as 100 wagers. In some embodiments the threshold number of wagers may be a different number, such as 150 wagers, 200 wagers, or any other number, then the cohort module 130 returns, at step 516, to the base module 124.

FIG. 6 illustrates the user correlation module 132. The process begins with the user correlation module 132 being initiated, at step 600, by the base module 124. The user correlation module 132 filters, at step 602, the user database 116 on users with over the threshold number of wagers, such as 100 wagers. In some embodiments the threshold number of wagers may be a different number, such as 150 wagers, 200 wagers, or any other number. For example, the user database 116 is filtered to include only users who have completed more than the threshold number of wagerins in their wager history to separate the users who have used the application before and the new users of the application. Then the user correlation module 132 filters, at step 604, the user database 116 on the first user. The user correlation module 132 filters, at step 606, the user's data on the first parameter. For example, the first parameter may be the average wager size for the user. In some embodiments, the parameters may be the mean of wager for the user, the median of wager for the user, the number of contacts of the user, the user's time spent on the application, the amount of time the user has spent on research, etc. Then the user correlation module 132 performs, at step 608, correlations on the remaining parameters. For example, the user database 116 is filtered on the user ID, and one of the parameters, such as the user's average wager size and then correlations are performed on the rest of the parameters with the selected parameter that has filtered the database, such as the number of contacts the user has, the amount of time the user spends on the application per week, and the time on research the user spends per week, etc. An example of correlated parameters is the user's average wager size vs. the number of contacts the user has with a 0.91 correlation coefficient, and this correlation is extracted and stored in the user correlation database 140. Another example of correlated parameters is the user's average wager size vs. the amount of time the user spends on the application per week with a 0.89 correlation coefficient. This correlation is extracted and stored in the user correlation database 140. An additional example of correlated parameters is the user's average wager size vs. the time on research the user spends per week with a 0.88 correlation coefficient, and this correlation is extracted and stored in the user correlation database 140. The user correlation module 132 stores, at step 610, the correlations in the user correlation database 140. For example, for user ID JS12345 the correlation coefficient of 0.91 for the user's average wager size vs. the number of contacts the user has, the correlation coefficient of 0.89 for the user's average wager size vs. the amount of time the user spends on the application per week, and the correlation coefficient of 0.88 for the user's average wager size vs. the time on research the user spends per week is stored in the user correlation database 140. Then the user correlation module 132 determines, at step 612, if more parameters are remaining. If it is determined that more parameters are remaining, the user correlation module 132 filters, at step 614, the user database 116 on the next parameter. If it is determined that there are no more parameters remaining for the filtered user in the user database 116, the user correlation module 132 determines, at step 616, if more users are remaining in the user database 116. If it is determined that more users are remaining in the user database 116, the user correlation module 132 filters, at step 618, the user database 116 on the next user, and the process returns to filtering the user database 116 on the first parameter. If it is determined that there are no more users remaining in the user database 116, then the user correlation module 132 returns, at step 620, to the base module 124.

FIG. 7 illustrates the new user correlation module 134. The process begins with the new user correlation module 134 being initiated, at step 700, by the base module 124. The new user correlation module 134 filters, at step 702, the user database 116 on users with under the threshold number of wagers, such as 100 wagers. In some embodiments the threshold number of wagers may be a different number, such as 150 wagers, 200 wagers, or any other number. For example, the user database 116 is filtered to include only users who have completed less than the threshold number of wagers in their wager history to separate the users who have used the application before and the new users of the application. Then the new user correlation module 134 filters, at step 704, the user database 116 on the first user. The new user correlation module 134 filters, at step 706, the user's data on the first parameter. For example, the first parameter may be the average wager size for the user. In some embodiments, the parameters may be the mean of wager for the user, the median of wager for the user, the number of contacts of the user, the user's time spent on the application, the amount of time the user has spent on research, etc. Then the new user correlation module 134 performs, at step 708, correlations on the remaining parameters. For example, the user database 116 is filtered on the user ID, and one of the parameters, such as the user's average wager size and then correlations are performed on the rest of the parameters with the selected parameter that has filtered the database, such as the number of contacts the user has, the amount of time the user spends on the application per week, and the time on research the user spends per week, etc. An example of correlated parameters is the user's average wager size vs. the number of contacts the user has with a 0.91 correlation coefficient, and this correlation is extracted and stored in the new correlation database 142. Another example of correlated parameters is the user's average wager size vs. the amount of time the user spends on the application per week with a 0.89 correlation coefficient, and this correlation is extracted and stored in the new correlation database 142. An additional example of correlated parameters is the user's average wager size vs. the time on research the user spends per week with a 0.88 correlation coefficient, and this correlation is extracted and stored in the new correlation database 142. The new user correlation module 134 stores, at step 710, the correlations in the new correlation database 142. For example, for user ID TR98765, the correlation coefficient of 0.91 for the user's average wager size vs. the number of contacts the user has, the correlation coefficient of 0.89 for the user's average wager size vs. the amount of time the user spends on the application per week, and the correlation coefficient of 0.88 for the user's average wager size vs. the time on research the user spends per week is stored in the new correlation database 142. Then the new user correlation module 134 determines, at step 712, if more parameters are remaining. If it is determined that more parameters are remaining, the new user correlation module 134 filters, at step 714, the user database 116 on the next parameter. If it is determined that there are no more parameters remaining for the filtered user in the user database 116, the new user correlation module 134 determines, at step 716, if more users are remaining in the user database 116. If it is determined that more users are remaining in the user database 116, the new user correlation module 134 filters, at step 718, the user database 116 on the next user, and the process returns to filtering the user database 116 on the first parameter. If it is determined that there are no more users remaining in the user database 116, then the new user correlation module 134 returns, at step 720, to the base module 124.

FIG. 8 illustrates the user similarity module 136. The process begins with the user similarity module 136 being initiated, at step 800, by the base module 124. The user similarity module 136 filters, at step 802, the new correlation database 142 on the first user ID. Then the user similarity module 136 extracts, at step 804, the user's data from the new correlation database 142. For example, for user ID TR98765, the correlation coefficient of 0.91 for the user's average wager size vs. the number of contacts the user has, the correlation coefficient of 0.89 for the user's average wager size vs. the amount of time the user spends on the application per week, and the correlation coefficient of 0.88 for the user's average wager size vs. the time on research the user spends per week is extracted from the new correlation database 142. The user similarity module 136 compares, at step 806, the extracted user's data to the user correlation database 140. For example, for user ID TR98765, the correlation coefficient of 0.91 for the user's average wager size vs. the number of contacts the user has, the correlation coefficient of 0.89 for the user's average wager size vs. the amount of time the user spends on the application per week, and the correlation coefficient of 0.88 for the user's average wager size vs. the time on research the user spends per week is compared to the data stored in the user correlation database 140 to find a match for a user with similar correlation coefficients which can be determined that the user will have similar interests, wagering patterns, and long term value to the wagering network 114. Then the user similarity module 136 determines, at step 808, the closest matching user ID. For example, user ID TR98765 and user ID JS12345 both have the same correlation coefficients of 0.91 for the user's average wager size vs. the number of contacts the user has, the correlation coefficient of 0.89 for the user's average wager size vs. the amount of time the user spends on the application per week, and the correlation coefficient of 0.88 for the user's average wager size vs. the time on research the user spends per week. The closest matching user ID may fall within a threshold variance of the extracted user's data. The threshold variance may not be required to have the exact correlation coefficients but could have closely similar correlation coefficients such as a difference of 0.01, 0.02, 0.03, etc. The threshold variance may be a percentage difference, such as +/−5% or +/−10%. Then the user similarity module 136 extracts, at step 810, the matching user ID. For example, the user ID JS12345 is extracted from the user correlation database 140. The user similarity module 136 filters, at step 812, the user database 116 on the matching user ID. For example, the user database 116 is filtered on the user ID JS12345. Then the user similarity module 136 extracts, at step 814, the matching user ID's cohort, notification settings, and incentives. For example, the data extracted would show the user ID JS12345 cohort is cohort one, the notification settings may be for football wagers when a team enters the red zone or is within 20 yards of the endzone, and the incentives offered to the user, such as wagering on football when a team is within 25 yards of the endzone results increased odds such as 3:1 for the team to score a touchdown as opposed to 2:1. The user similarity module 136 stores, at step 816, the extracted cohort, notification settings, and incentives in the user database 116 for the matched user. For example, for the user ID TR98765, the cohort of cohort 1, the notification settings may be for football wagers when a team enters the red zone or is within 20 yards of the endzone. The incentives offered to the user, such as wagering on football when a team is within 25 yards of the endzone, results in increased odds such as 3:1 for the team to score a touchdown as opposed to 2:1 is stored in the user database 116 under the user ID TR98765. Then the user similarity module 136 determines, at step 818, if more users remain in the new correlation database 142. If it is determined that more users are remaining in the new correlation database 142, the user similarity module 136 filters, at step 820, the new correlation module 136 on the next user ID, and the process returns to extracting the user's data from the new correlation database 142. If it is determined that there are no more users remaining in the new correlation database 142, then the user similarity module 136 returns, at step 822, to the base module 124.

FIG. 9 illustrates the cohort database 138. The database contains the thresholds to determine a user's cohort and the corresponding cohort, for example, the cohort, and the requirements such as the average number of wagers per week, the median of wagers per week in dollar amounts, the mean of wagers per week in dollar amounts, the time the user spends on the application per week, the amount of time the user spends on research per week, the amount of time the user spends on the wager markets per week or the time the user is viewing the wagers offered by the application per week. The database is used in the process described in the cohort module 130, in which the user's data stored in the user database 116 is compared to these thresholds to determine which cohort the user belongs to. The cohorts may represent the type of player the user is on the application, such as an expert, average, or beginner user, which may be used to determine the user's long-term value to the wagering network 114. In some embodiments, the thresholds may have different periods such as per month, per quarter, per year, etc. In some embodiments, the user may need to exceed the thresholds for all the requirements stored in the cohort database 138, a predetermined number of requirements, such as 3, or exceed the threshold of one requirement to be considered to be placed in the corresponding cohort.

FIG. 10 illustrates the user correlation database 140. The database is created in the process described in the user correlation module 132, in which the user's data is correlated with other types of user data, and the correlation coefficients are stored in the database. The database is also used in the user similarity module 136 in which the users in this database may be matched with new users using the correlation coefficients stored in the new correlation database 142 to determine how new users will behave on the wagering network by finding a similar user in the user correlation database 140. In addition, the database contains the user IDs, such as JS 12345, the correlation coefficients of correlated data, such as the average wager size vs. the number of contacts the user has with a correlation coefficient of 0.91, the average wager size vs. the time the user spends on the application with a correlation coefficient of 0.89, or the average wager size vs. the time the user spends on research with a correlation coefficient of 0.88. "N" may be used to represent an infinite number of the potential correlation coefficients between two pieces of data stored in the database.

FIG. 11 illustrates the new correlation database 142. The database is created in the process described in the new user correlation module 134, in which the user's data is correlated with other types of user data, and the correlation coefficients are stored in the database. The database is also used in the user similarity module 136 in which the new users in this database may be matched with users using the correlation coefficients stored in the user correlation database 140 to determine how new users will behave on the wagering network by finding a similar user in the user correlation database 140. In addition, the database contains the user IDs, such as TR98765, the correlation coefficients of correlated data, such as the average wager size vs. the number of contacts the user has with a correlation coefficient of 0.91, the average wager size vs. the time the user spends on the application with a correlation coefficient of 0.89, or the average wager size vs. the time the user spends on research with a correlation coefficient of 0.88. "N" may be used to represent an infinite number of the potential correlation coefficients between two pieces of data stored in the database.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of sorting a plurality of users of a network into a cohort, comprising:
    rating long term value information associated with an experienced user from user data;
    determining user engagement information associated with the experienced user from the user data by tracking user activity on a wagering application;
    performing correlations on user parameters recorded after the commencement of a live sporting event and based on the user data, the rated long term value information, and the determined user engagement information, wherein the rating, determining, and performing steps are automatically initiated when a user among a plurality of users places a number of wagers exceeding a threshold number of wagers and the rating, determining, and performing steps are automatically repeated on the plurality of users in the user database having a number of wagers that exceed a threshold number of wagers defining the cohort in real time whenever a user in the cohort makes a further wager;
    extracting the user data from a user database for a new user, wherein the new user is a user with less than a threshold number of wagers;
    performing correlations on user parameters for the new user recorded after the commencement of the live sporting event and based on the extracted user data during wagering activity in the live sporting event, the rated long term value information, and user engagement information associated with the new user;
    filtering a user correlation database for correlations of a first user ID;
    searching for correlated parameters from the user correlation database that fall within a threshold variance of the correlations of the first user ID; and,
    when the correlated parameters fall within the threshold variance, adding the new user to the cohort during the live sporting event.

2. The method of claim 1, further comprising:
    comparing the user parameters associated with the experienced user with data in a cohort database, wherein the data in the cohort database is a threshold for each parameter, and
    assigning the experienced user to a cohort where the user parameters meet threshold data contained in the cohort database.

3. The method of claim 2, further comprising:
    assigning the experienced user to the cohort where at least one of the user parameters meets the corresponding threshold data contained in the cohort database.

4. The method of claim 3, wherein, when comparing the user parameters associated with the experienced user with data in the cohort database, the threshold for each parameter is +/−10%.

5. The method of claim 1, wherein the long term value information includes an average number of wagers, a median value of the wagers, and a mean value of wagers.

6. The method of claim 1, wherein the long term value information includes at least one of how much the experienced user has lost to the network, how many friends the experienced user has invited to the network, or how much the experienced user has promoted the network on other applications.

7. The method of claim 1, further comprising:
    filtering user data for one or more experienced users with more than a threshold number of wagers; and
    extracting user data for one of the one or more experienced users with more than the threshold number of wagers from a user database.

8. The method of claim 1, further comprising:
    extracting notification settings and incentives for the experienced user associated with the correlated parameters from the user correlation database that fall within a threshold variance of the correlations of the first user ID.

9. The method of claim 8, further comprising:
    applying the notification settings and incentives of the experienced user to the first user ID.

10. The method of claim 8, wherein the extracting of the notification settings and incentives for the experienced user associated with the correlated parameters from the user correlation database that fall within a threshold variance of the correlations of the first user ID further comprises:

extracting the cohort associated with the experienced user, and the cohort associated with the experienced user is further applied to the first user ID.

11. A system for sorting a plurality of users of a network into cohorts comprising:
   a user database which contains data associated with a plurality of users and stores long term value information and user engagement information;
   a long term value (LTV) module which extracts data for an experienced user with more than a threshold number of wagers from the at least one user in the user database and rates the long term value information associated with the experienced user from the data associated with the at least one user;
   a user engagement module which extracts the data for the experienced user with more than the threshold number of wagers from the at least one user in the user database and determines the user engagement information associated with the experienced user from the data associated with the at least one user;
   a user correlation module which performs correlations on user parameters recorded after the commencement of a live sporting event and based on the rated long term value information, user engagement information, and data associated with the experienced user for the experienced user with more than the threshold number of wagers, wherein the user correlation module is automatically initiated when the new user places a number of wagers exceeding a threshold number and the correlations are automatically repeated in real time during the live sporting event whenever a user in the cohort makes a further wager;
   a new user correlation module which performs correlations on user parameters for a new user with less than the threshold number of wagers recorded after the commencement of the live sporting event and based on the data, the long term value information, and the user engagement information associated with the new user; and
   a user similarity module configured to:
   determine correlations of a first user ID,
   search for correlated parameters that fall within a threshold variance of the correlations of a first user ID, and
   adding the new user to the cohort when the correlated parameters fall within the threshold variance.

12. The system of claim 11, wherein the user similarity module further extracts the notifications settings incentives for the experienced user associated with the correlated parameters from the user correlation database that fall within a threshold variance of the correlations of the first user ID, and applies the notification settings and incentives of the experienced user to the first user ID.

13. The system of claim 11, further comprising:
   a cohort database which contains classification cohorts and a threshold for each parameter that needs to be met for the experienced user to be classified in the cohort, and
   a cohort module which compares the user parameters associated with the experienced user with data in a cohort database and assigns the experienced user to the cohort if the threshold for each parameter is met.

14. The system of claim 13, wherein the cohort module assigns the experienced user to the cohort if the threshold for at least one parameter is met.

15. The system of claim 14, wherein the user similarity module further extracts the cohort associated with the experienced user and applies the cohort associated with the experienced user to the first user ID.

16. The system of claim 11, wherein when the user similarity module compares the user parameters associated with the first user ID to the user parameters associated with the experienced user with data in a cohort database, the threshold for each parameter is +/−10%.

17. The system of claim 11, wherein the long term value information includes the average number of wagers, the median value of the wagers, and the mean value of wagers.

18. The system of claim 11, wherein the long term value information includes at least one of how much the experienced user has lost to the network, how many friends the experienced user has invited to the network, or how much the experienced user has promoted the network on other applications.

* * * * *